July 2, 1940.  J. READ ET AL  2,206,790
CUTTER FOR PICKING FRUIT
Filed Aug. 14, 1939
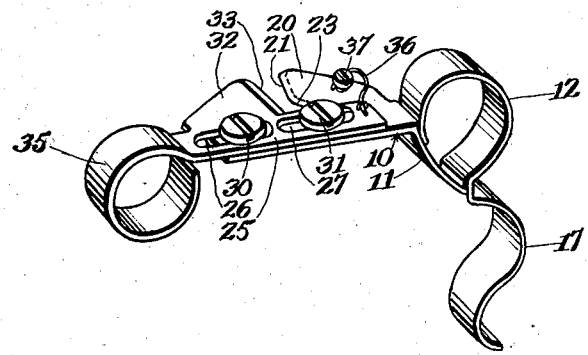
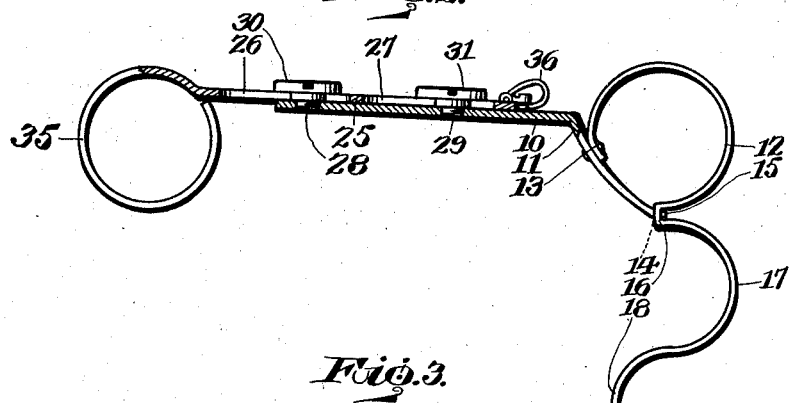
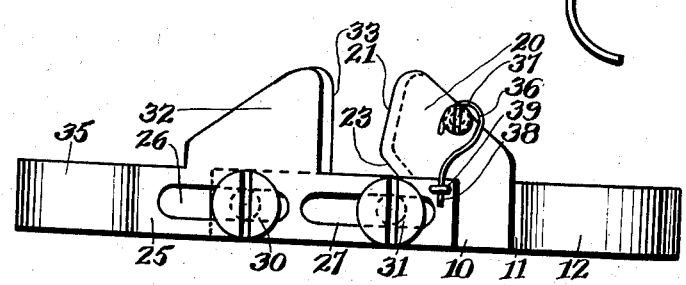
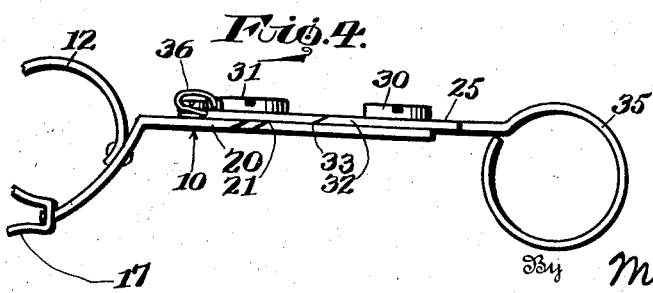
Inventor
J. Read
P. H. Read
By Munn, Anderson & Liddy
Attorney Patented July 2, 1940

2,206,790

UNITED STATES PATENT OFFICE 2,206,790

CUTTER FOR PICKING FRUIT

James Read and Philip H. Read, New Smyrna Beach, Fla.

Application August 14, 1939, Serial No. 290,092

5 Claims. (Cl. 30—232)

This invention relates to a cutter for picking fruit.

An object of the invention is the provision of a device for rapidly removing fruit of various types from trees where the fruit hangs from the tree by means of a stem, the device being so constructed that it can be operated by certain fingers of the hand of the operator while the fruit may be held in the palm of the hand in connection with the remaining fingers.

Another object of the invention is the provision of a device for cutting the stems of fruit hanging from a tree in which the device may be manipulated by certain fingers of the hand of the operator while the remaining fingers may support the fruit while the stem is being cut against the palm of the hand, the device consisting of a pair of cutters with one of the cutters being carried by a stationary member while the other cutter is carried by a bar slidably mounted on the stationary member, the bar being reciprocated by the thumb of the operator.

A further object of the invention is the provision of a simple and efficient device for cutting the stems of fruit hanging from trees whereby the fruit may be removed in one operation by one hand of the operator.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a device constructed in accordance with the principles of our invention.

Figure 2 is a vertical longitudinal section of the cutter.

Figure 3 is a plan view of the same.

Figure 4 is a longitudinal side view of the cutter which is opposite to the view shown in Figure 2.

Referring more particularly to the drawing, 10 designates a base member having a curved member 11 depending from one end of the base member 10 and outwardly therefrom.

An index finger grip 12 is secured by means of rivets 13 to the upper end of the member 11. The finger support 12 is substantially circular and is provided with an opening 14 to receive a lug 15 formed integrally on the lower end of the member 11. The outer end of the lug is swaged for securely connecting the U-shaped portion 16 at the lower end of the finger support 12 to the lower end of the member 11.

The portions 17 and 18 are curved in opposite directions to receive the intermediate fingers located between the index and the little finger of the hand of the operator. Thus, it will be seen that the little finger is free to engage around the fruit and press it against the palm of the hand to support the fruit when the stem is being cut.

A blade 20 extends laterally from one edge of the base member 10 and has a knife edge 21 inclined at an acute angle to a line extending at right angles from the side edge 22 of the base member 10. A knife edge 23 forms an acute angle with the edge 22 of the base member 10 and is located inwardly of the knife edge 21.

A slidable member 25 is mounted for reciprocation on the base member 10 and is provided with a pair of elongated slots 26 and 27 adapted to receive the shanks of bolts 28 and 29 respectively which are screwed into threaded passages in the base member 10 as shown in Figure 2. These bolts are provided with heads of large diameter shown respectively at 30 and 31 which engage the outer surface of the slidable member 25.

A cutter 23 extends laterally from one side edge of the member 25 and has a knife edge 33 located at a right angle to the side edge of the member 25. It will be noted that the knife edge 33 is beveled in an opposite direction from the bevel of the knife edge 21 so that when the knife edge 33 rides over the knife edge 21 these two edges will be in close association for effectively cutting the stem which is ordinarily forced within the notch by the knife edge 33 and between the adjacent side edges of the base member 10 and the slidable member 25.

A thumb holder 35 is formed integrally on the outer end of the slidable member 25 and is located below the plane of said member and is adapted to receive the thumb of the operator during the cutting operation.

A spring member 36 is secured by means of a bolt 37 to the cutter 20 while the other end 38 of the spring is secured to the slidable member 25 by means of an eye 39 so that when the cutters are moved toward each other for the cutting operation and are released the spring will force the cutters apart automatically.

The operation of our device is as follows: The thumb of the operator is placed in the circular member 35 and the index finger is placed in the circular member 12. Two fingers are received by the curved members 17 and 18. The little finger of the operator is then free to be pressed against the fruit so that the fruit may be held in the palm of the hand during the cutting of the stem.

The instrument is then ready for the cutting operation and it is only necessary for the operator to move the thumb towards the fingers while simultaneously moving the fingers towards the thumb whereby the sliding member 25 will be moved inwardly and the cutting edges 21, 23 and 33 will be moved towards each other and the stem will be cut between the cutting edge 23 and the cutting edge 33 so that when sufficient pressure is exerted on the base member 10 and the sliding member 25 the stem will be severed. Due to the fact that the operator can use his little finger to support the fruit the fruit can be readily discharged into a basket.

We claim:

1. A cutter for picking fruit comprising a pair of bars slidably mounted on each other, a blade projecting laterally from each bar and having knife edges moving over each other in close association, a thumb receiving element mounted on an end of one bar, a plurality of finger receiving elements mounted on the opposite end of the other bar, means for maintaining the bars in slidable contact with each other, and a spring for maintaining the bars and likewise the knife edges outwardly from each other.

2. A cutter for picking fruit comprising a pair of bars slidably mounted on each other, means for maintaining the bars in sliding contact with each other, a thumb receiving member formed integrally with an end of one of the bars, the opposite end of the other bar having a curved depending flange, a metal strap secured to the depending flange adjacent the associated end of the second mentioned bar, said strap being curved to receive a finger of the operator between the curved portion and the depending flange, means for connecting the free end of the flange with the strap, said strap being curved outwardly from the free end of the flange and then inwardly to provide a pair of finger engaging elements, a blade projecting laterally from each bar and having knife edges in slidable contact with each other.

3. A cutter for picking fruit comprising a pair of bars slidably mounted on each other, means for maintaining the bars in sliding contact with each other, a thumb receiving member formed integrally with an end of one of the bars, the opposite end of the other bar having a curved depending flange, a metal strap secured to the depending flange adjacent the associated end of the second mentioned bar, said strap being curved to receive a finger of the operator between the curved portion and the depending flange, means for connecting the free end of the flange with the strap, said strap being curved outwardly from the free end of the flange and then inwardly to provide a pair of finger engaging elements, a blade projecting laterally from each bar and having knife edges in slidable contact with each other, one knife edge being located at substantially a right angle to the side edge of its associated bar, the knife edge of the other blade being inclined at an acute angle to an edge of the associated bar.

4. A cutter for picking fruit comprising a pair of bars slidably mounted on each other, means for maintaining the bars in sliding contact with each other, a thumb receiving member formed integrally with an end of one of the bars, the opposite end of the other bar having a curved depending flange, a metal strap secured to the depending flange adjacent the associated end of the second mentioned bar, said strap being curved to receive a finger of the operator between the curved portion and the depending flange, means for connecting the free end of the flange with the strap, said strap being curved outwardly from the free end of the flange and inwardly to provide a pair of finger engaging elements, a blade projecting laterally from each bar and having knife edges in slidable contact with each other, one knife edge being located at substantially a right angle to the side edge of its associated bar, the knife edge of the other blade being inclined at an acute angle to an edge of the associated bar, the last mentioned blade having a cut-out portion adjacent the associated edge of the connected bar to form a notch to receive the stem of the fruit, one edge of the cut-out portion of the blade being sharpened to form a knife.

5. A cutter for picking fruit comprising a pair of bars slidably mounted on each other, means for maintaining the bars in sliding contact with each other, a thumb receiving member formed integrally with an end of one of the bars, the opposite end of the other bar having a curved depending flange, a metal strap secured to the depending flange adjacent the associated end of the second mentioned bar, said strap being curved to receive a finger of the operator between the curved portion and the depending flange, means for connecting the free end of the flange with the strap, said strap being curved outwardly from the free end of the flange and then inwardly to provide a pair of finger engaging elements, a blade projecting laterally from each bar and having knife edges in slidable contact with each other, one knife edge being located at substantially a right angle to the side edge of its associated bar, the knife edge of the other blade being inclined at an acute angle to an edge of the associated bar, and a spring connected at one end with one blade connected to a bar, the other end of the spring being connected to the adjacent end of the other bar for maintaining the knife edges in separated relation when in an inoperative position.

JAMES READ.
PHILIP H. READ.